United States Patent [19]

Simmons

[11] Patent Number: 5,529,593
[45] Date of Patent: Jun. 25, 1996

[54] FILTER SCREEN ASSEMBLY FOR USE WITH AN AIR INTAKE UNIT

[75] Inventor: Jesse K. Simmons, Livonia, Mich.

[73] Assignee: Air Solution Company, Livonia, Mich.

[21] Appl. No.: 319,958

[22] Filed: Oct. 7, 1994

[51] Int. Cl.⁶ .................................................. B01D 46/18
[52] U.S. Cl. .......................... 55/354; 55/422; 55/471; 95/277
[58] Field of Search ........................ 55/422, 496, 491, 55/472, 473, 471, 467, 351, 354; 95/277

[56] References Cited

U.S. PATENT DOCUMENTS

| | | | |
|---|---|---|---|
| 3,190,059 | 6/1965 | Bauder et al. | 55/491 |
| 3,348,822 | 10/1967 | Vieceli et al. | 261/34.1 |
| 3,470,680 | 10/1969 | Avera | 55/497 |
| 3,596,442 | 8/1971 | Neumann | 55/471 |
| 3,710,552 | 1/1973 | Genton | 55/291 |
| 3,759,018 | 9/1973 | Scholl | 55/487 |
| 4,421,862 | 6/1995 | Davis | 55/491 |
| 4,601,737 | 7/1986 | Gerbig | 55/493 |
| 4,743,281 | 5/1988 | Kennedy et al. | 55/493 |
| 4,889,542 | 12/1989 | Hayes | 95/285 |
| 5,156,662 | 10/1992 | Downing et al. | 55/496 |

FOREIGN PATENT DOCUMENTS

| | | | |
|---|---|---|---|
| 2131259 | 1/1973 | Germany | 55/422 |
| 1487952 | 6/1989 | U.S.S.R. | 55/422 |

*Primary Examiner*—Jay H. Woo
*Assistant Examiner*—Duane S. Smith
*Attorney, Agent, or Firm*—Gifford, Krass, Groh, Sprinkle, Patmore, Anderson & Citkowski

[57] ABSTRACT

A filter screen assembly for use with an air intake unit, the air intake unit having a top, a bottom and at least one side wall. A flexible screen is provided as a roll wound onto a spindle. The spindle is held within a vertically extending container secured to the side of the unit. The container has a bottom and side walls which define an open interior for receiving the spindle and the spindle is rotatably supported at opposite ends within the container. The flexible screen is unwound from the spindle and is attached to the sides of the unit at predetermined locations around the periphery of the unit. The spindle may further be dismounted from the container and the flexible screen manually rewound onto the spindle.

10 Claims, 1 Drawing Sheet

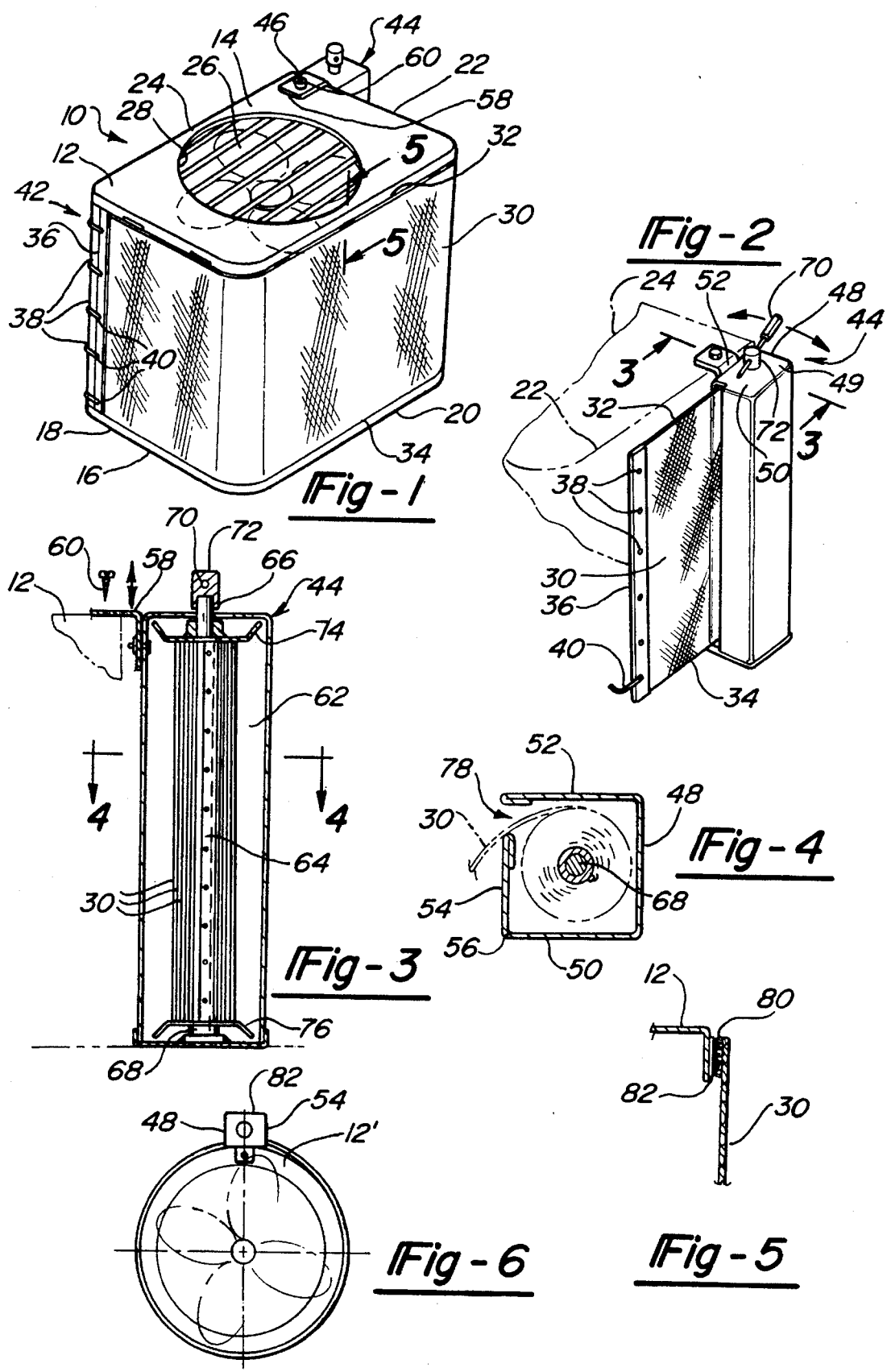

FILTER SCREEN ASSEMBLY FOR USE WITH AN AIR INTAKE UNIT

BACKGROUND OF THE INVENTION

1. Field of the Invention

The present invention relates generally to screen assemblies and, more particularly, to a flexible filter screen for use with an air intake unit.

2. Description of the Prior Art

Filtering assemblies are known in the art which can be used with conventional air intake units. These units are normally such devices as air conditioner and condenser units which are used in residential and commercial environments. Such units can also be used in industrial settings, particularly on rooftop units.

U.S. Pat. No. 4,743,281, issued to Kennedy, teaches a filter panel assembly for an air moving appliance. An air permeable panel structure is mounted adjacent to each side of the appliance and is provided with latch means for pivoting the panel outwardly to permit insertion of an unmounted porous filter.

U.S. Pat. No. 3,759,018, issued to Scholl, discloses a U-shaped fluid treating filter for mounting to existing air processing units. The filter has a base and upwardly extending side portions and is installed as a one piece unit around the existing air processing unit.

The shortcoming of the above-mentioned patents is that they do not teach a simple, yet effective, way for applying a flexible filter over air flow units of different types and sizes. Furthermore, the prior art does not provide for a filter assembly with excess filter capacity and a means for advancing a fresh area of filter over the desired opening once a used portion of filter has become too dirty and congested to provide adequate filtration.

SUMMARY OF THE PRESENT INVENTION

The present invention is a filter screen assembly for use with an air intake unit. The air intake unit normally includes a top, a bottom and at least one side wall which defines either a circular or rectangular shape. A quantity of a flexible screen is wound onto a spindle. The spindle is rotatably connected to a container which is secured to the air intake unit and extends vertically substantially the height of the unit. A desired area of flexible screen corresponding to the area of the intake unit to be covered is unwound from the roll. A series of attachment means are located at predetermined positions along at least one edge of the screen and the air intake unit. The attachment means may include ringlets formed along the length of the screen which are received upon hooks extending from the air intake unit. The attachment means also can include first and second pluralities of velcro portions which secure the screen to the sides of the air intake unit. The screen is provided on the spindle in such quantities so as to permit the spindle to be unwound to advance fresh screen over the area desired to be covered.

BRIEF DESCRIPTION OF THE DRAWING

Reference will now be made to the attached drawing, when read in combination with the following specification, wherein like reference numerals refer to like parts throughout the several views, and in which:

FIG. 1 is a perspective view of the filter screen assembly according to the present invention;

FIG. 2 is a sectional view similar to FIG. 1 and showing the container for the filter screen assembly according to the present invention;

FIG. 3 is a cutaway view taken along line 3–3 of FIG. 2 and showing the spindle within the container for holding the flexible filter screen of the present invention;

FIG. 4 is a cutaway view taken along line 4–4 of FIG. 3 and showing a cross section of flexible screen wound onto the spindle according to the present invention;

FIG. 5 is a cutaway taken along line 5–5 of FIG. 1 and showing the manner of attaching the filter screen to the air intake system according to a preferred embodiment of the present invention; and FIG. 6 is a top view similar to the view shown in FIG. 1 and showing the filter screen assembly being affixed to an air intake unit shaped in a round configuration.

DESCRIPTION OF THE PREFERRED EMBODIMENT

Referring to FIG. 1, a filter screen assembly 10 for use with an air intake unit 12 is shown. The air intake unit 12 is normally a ground level or rooftop mounted air conditioner or air processing unit and, according to a first known embodiment, is of a polygonal shape having a top 14, a bottom 16, a first side 18, a second side 20, a third side 22 and a fourth side 24. A fan unit 26 is normally built into the air intake unit 12 and includes an aperture 28 for drawing in or discharging out surrounding air. Referring to FIG. 6, the air intake unit 12' can alternatively be cylindrically shaped.

Referring again to FIG. 1, the filter screen assembly 10 includes a flexible screen 30 which is preferably constructed of either a polyester or a wire mesh material and provides the necessary characteristics of pliancy and resiliency. The flexible screen 30 includes an upper edge 32, a lower edge 34 and a trailing end 36. A plurality of ringlets 38 are formed at spaced intervals along a vertical distance of the trailing end 36 and are engaged by hooks 40 extending from a vertical edge 42 of the air intake unit 12 to secure the flexible screen 30 against the side of the air intake unit 12.

Referring further to FIGS. 2 and 3, a container 44 is attached to the side 22 of the air intake unit adjacent a vertically extending edge 46 forming a boundary between the sides 22 and 24. The container has a base 48 and a pair of side walls 50 and 52 which define an open interior. Referring to FIG. 4, a lid portion 54 is attached along an edge of the sidewall 50 and is rotatable about a hinge 56 to reveal the interior of the container. Referring further to FIG. 3, the container 44 is attached to the air intake unit 12 by a bracket 58 which extends from the container. A screw 60 inserts through an aperture in the bracket and the top of the unit (not shown) to secure the container in a vertically extending manner. Alternatively, the container can be attached along the top or the bottom of the intake unit and the flexible screen advanced vertically across the side (not shown).

Referring again to FIG. 3, a spindle 62 is mounted so as to extend longitudinally within the container 44. The spindle 62 includes a shaft 64 which is connected to an upper end of the container by member 66 and is connected to a lower end of the container by member 68. Members 66 and 68 are rotatably secured at the opposite ends of the container to permit the shaft 64 to freely rotate. Spring means as are known in the art can be built into the spindle to cause it to retract the screen. A crank 70 is rotatably connected to the upper member 66 by an intermediate connection 72. The crank 70 enables the spindle shaft to be rotated from outside of the container. Motorized means for rotating the spindles (not shown) may alternatively be employed in place of the crank.

The flexible screen is wound around the shaft 64 of the spindle within the container in a plurality of layers. An upper guiding portion 74 and a lower guiding portion 76 are positioned at opposite ends of the shaft in proximity to the members 66 and 68 and ensure that the flexible screen is wound around the shaft in a properly overlapping manner. Referring again to FIG. 4, an open space 78 is provided between the lid portion 54 and the side 52 of the container. The space 78 provides adequate clearance for the flexible screen to be unwound from the spindle within the container and advanced around the edges of the air intake unit, as is evident from FIG. 2. Referring to FIG. 6, the flexible screen may be advanced around a continuous edge of a circular air intake unit 12' and attached to the rear side or bottom 48 of the container. The alternately configured and conventional air intake unit of FIG. 6 utilizes an identical filter screen assembly as is used with the conventional air intake unit of FIGS. 1 and 2.

The spindle can be detached from within the container by rotating the lid portion of the container away to reveal the interior of the container and by removing the upper and lower members of the spindle from within the corresponding ends of the container. A slot 49 may be formed in the upper end of the container to facilitate removal of the spindle (see FIG. 2). Removal of the spindle is desirable in some instances particularly when it is desirable to permit the flexible screen to be quickly rewound onto the shaft. Alternatively, the spindle can remain in place within the container and the crank can be employed to either unwind or rewind the flexible screen. A sufficient quantity of flexible screen is provided on the shaft so that additional screen can be unwound to replace a leading portion of the screen which becomes contaminated with use.

Referring again to FIG. 1, and further to the cutaway of FIG. 5, pluralities of interattaching means such as VELCRO portions are attached at spaced intervals along the interior of the flexible screen and the exterior of the air intake unit for the purpose of securing the screen all along the periphery of the intake unit. The VELCRO portions are interengaging fastener portions which are secured to separate articles and which, upon fastening together in a mesh-like manner, create a convenient engagement between the articles. Specifically, a first plurality of VELCRO portions 80 extend from the inside face of the screen 30 and engage a second plurality of identical portions 82 extending from the intake unit to detachably secure the screen in place. The holding forces of the VELCRO portions are such that the screen may be easily disengaged from the sides of the unit when it is desirable to either advance a fresh area of screen over the intake or to rewind the screen back onto the spindle. Other types of securing means can include snapping portions, cables and the like (not shown) for engaging the flexible against the side of the air intake unit in an inward position.

The filter assembly of the present invention can therefore be used with a wide range of differently configured air intake units. Having described my invention, additional embodiments will become apparent to those skilled in the art to which it pertains without deviating from the scope of the appended claims.

I claim:

1. A filter screen assembly for use with an air intake unit, the air intake unit having a top, a bottom and at least one side wall, said assembly comprising:

a flexible screen;

means for advancing said flexible screen across the side wall of the unit;

means for securing said flexible screen at desired locations along the side wall of the unit, said means for securing comprising a plurality of ringlets positioned at spaced intervals along an edge of said flexible screen, a corresponding plurality of hooks extending from along the side wall and engaging through said ringlets; and means for storing said flexible screen attached to the unit.

2. The filter screen assembly as described in claim 1, said means for storing comprising a vertically extending container attached to the side wall of the unit and extending substantially a length of the side wall which is equal to a height of the unit, said container having a bottom and a pair of side walls defining an open interior for receiving said screen and having a lid hingedly connected to one of said side walls.

3. The filter screen assembly as described in claim 2, said means for advancing comprising a spindle for supporting said flexible screen in a wound roll, said spindle having a first end and a second end which are rotatably attached to opposing ends of said container.

4. The filter screen assembly as described in claim 3, further comprising a crank communicating with an end of said spindle and extending from said container, said crank being rotated in one of either two directions to advance or to retract said flexible screen.

5. The filter screen assembly as described in claim 3, said spindle being removable from said container and rotated to rewind said flexible screen.

6. The filter screen assembly as described in claim 1, said flexible screen is constructed of a polyester material.

7. The filter screen assembly as described in claim 1, said flexible screen is constructed of a wire mesh material.

8. The filter screen assembly as described in claim 1, the air intake unit is quadrilateral in shape and said flexible screen attaches to a first side, a second side, a third side and a fourth side.

9. The filter screen assembly as described in claim 1, the air intake unit is round in shape and said flexible screen attaches to the unit around a circumference of the unit.

10. A filter screen assembly for use with an air intake unit, the air intake unit having a top, a bottom and at least one side wall, said assembly comprising:

a flexible screen;

means for advancing said flexible screen across the side wall of the unit;

means for securing said flexible screen at desired locations along the side wall of the unit, said means for securing comprising a first plurality of interengaging fastener portions positioned at spaced intervals along said flexible screen, a second plurality of interengaging fastener portions extending from the at least one side wall of the container and meshingly engaging with the first plurality of fastener portions; and means for storing said flexible screen attached to the unit.

* * * * *